F. H. DUKESMITH.
AIR BRAKE SYSTEM.
APPLICATION FILED SEPT. 17, 1907.

1,175,620.

Patented Mar. 14, 1916.
4 SHEETS—SHEET 2.

WITNESSES.

INVENTOR.
Frank H. Dukesmith

F. H. DUKESMITH.
AIR BRAKE SYSTEM.
APPLICATION FILED SEPT. 17, 1907.

1,175,620.

Patented Mar. 14, 1916.
4 SHEETS—SHEET 3.

WITNESSES.
J. R. Keller
Robert C. Totten

INVENTOR.
Frank H. Dukesmith
By Kay, Totten & Winter
Attorneys

THE COLUMBIA PLANOGRAPH CO., WASHINGTON, D. C.

F. H. DUKESMITH.
AIR BRAKE SYSTEM.
APPLICATION FILED SEPT. 17, 1907.

1,175,620.

Patented Mar. 14, 1916.
4 SHEETS—SHEET 4.

WITNESSES.

INVENTOR.
Frank H. Dukesmith
By Kay, Totten & Winter
Attorneys

UNITED STATES PATENT OFFICE.

FRANK H. DUKESMITH, OF PITTSBURGH, PENNSYLVANIA, ASSIGNOR, BY MESNE ASSIGNMENTS, TO SIMPLEX AIR BRAKE AND MANUFACTURING COMPANY.

AIR-BRAKE SYSTEM.

1,175,620.   Specification of Letters Patent.   Patented Mar. 14, 1916.

Application filed September 17, 1907. Serial No. 393,357.

*To all whom it may concern:*

Be it known that I, FRANK H. DUKESMITH, a resident of Pittsburgh, in the county of Allegheny and State of Pennsylvania, have invented a new and useful Improvement in Air-Brake Systems; and I do hereby declare the following to be a full, clear, and exact description thereof.

This invention relates to air brake systems and its object, briefly, is to provide an air brake system whereby the engineer is given better control over his brakes, whereby he is enabled to tell whether the brakes are in good working condition, and especially a system wherein the engineer can control his engine brakes either independently of or simultaneously with the train brakes, both as to application and release, as well as other advantages and functions which will hereinafter be described and claimed.

Briefly stated, the invention consists in providing a combined automatic and straight air or direct system, the automatic brake mechanism being applied to the cars of the train and the straight air mechanism to the engine, and both mechanisms being controlled by the same engineer's brake valve.

The invention also comprises other features, such as an equalizing accelerator valve for automatically controlling the train pipe exhaust and preventing the kicking off of the forward brakes of the train due to the surging of the air forwardly in the case of a train pipe having a large volume.

It also comprises a valve for controlling the exhaust from the engine brake cylinder and also arranged to apply the brakes on the engine automatically when the train brakes are applied due to the bursting of a hose, or when the engine is double-heading.

The invention also comprises an emergency vent valve located in the train pipe and arranged to open a large exhaust from said pipe when the engineer's valve is put to emergency position, in order to more quickly empty the train pipe.

In the accompanying drawings

Figure 1:
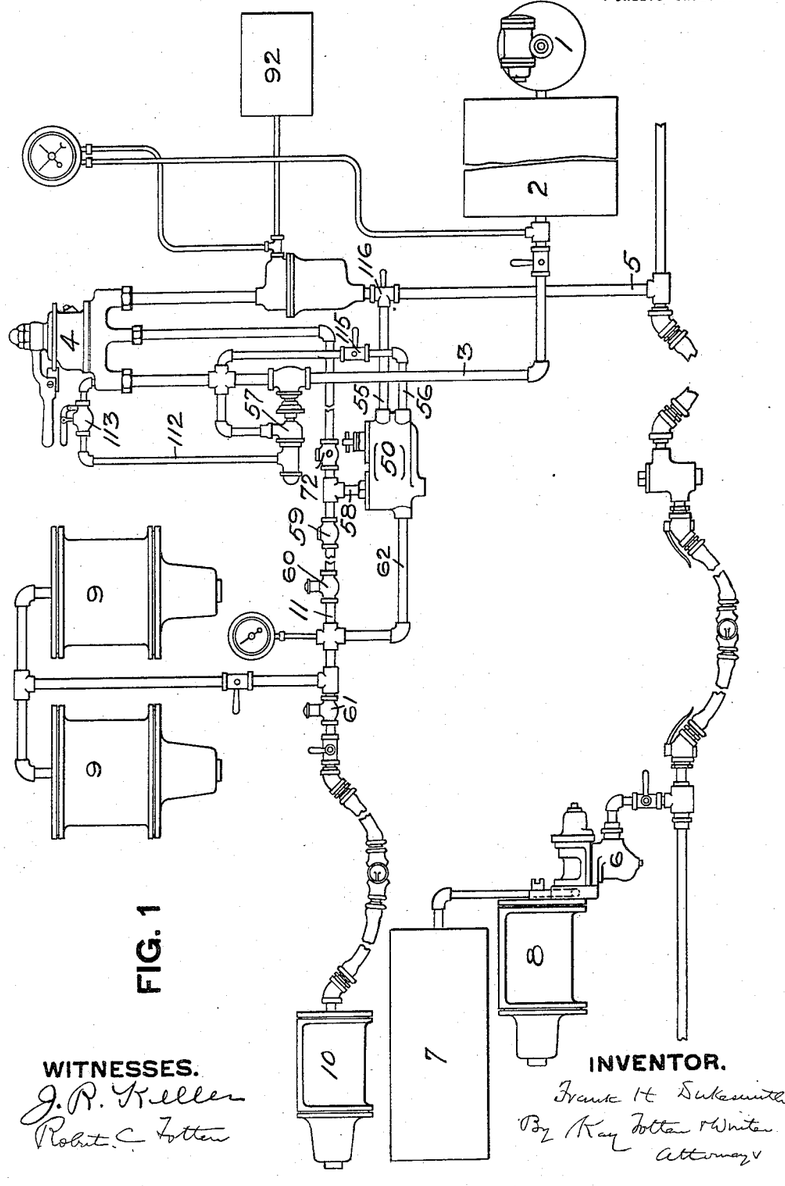
Figure 1 is a diagrammatic view of the air brake system.

My system comprises the usual air pump 1, main reservoir 2, pipe 3 leading from the main reservoir to the engineer's brake valve 4, and train pipe 5 connected to the engineer's brake valve and extending backwardly through the train and having connected thereto upon each car the usual automatic brake mechanism, comprising a triple valve 6, auxiliary reservoir 7 and brake cylinder 8, all connected up and operting in the usual way of automatic air brake systems, such as the Westinghouse or New York Air Brake Company's. The only difference from these systems in the parts so far described is in the construction and function of the engineer's brake valve 4 as will be hereinafter pointed out.

9 represents the engine brake cylinders and 10 the tender brake cylinder but the cylinders 9 and 10, instead of being connected to triple valves and auxiliary reservoirs, as in existing air brake systems, are connected by the pipe 11 directly to the engineer's brake valve 4, and are operated by straight air, or direct pressure, instead of automatically as is the usual custom.

The principal feature of the present invention is the construction and arrangement of the engineer's brake valve whereby the straight air engine and tender brakes can be operated either simultaneously with or independent of the automatic brakes on the cars.

Figure 2:
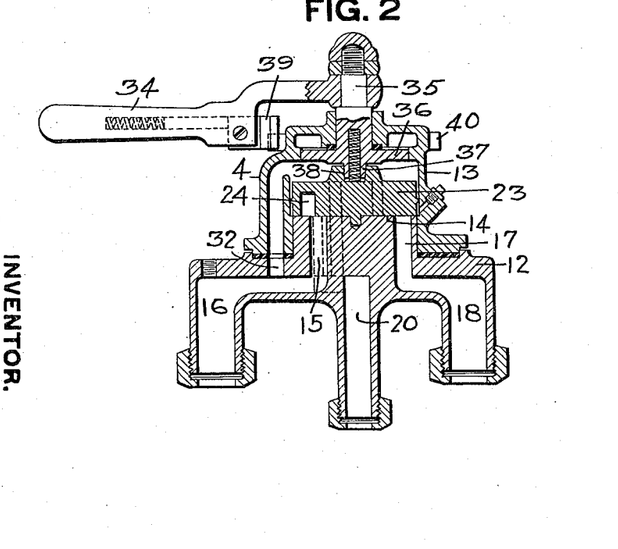
Fig. 2 is a vertical section through the engineer's brake valve.
Figure 3:
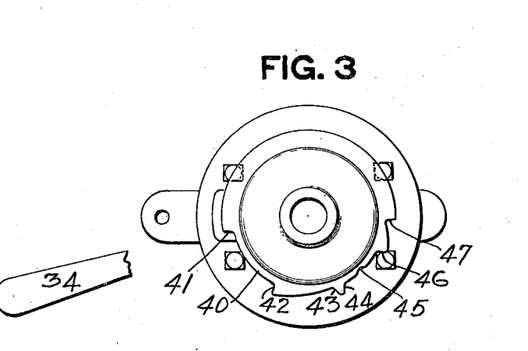
Fig. 3 is a plan view of the same.
Figure 4:
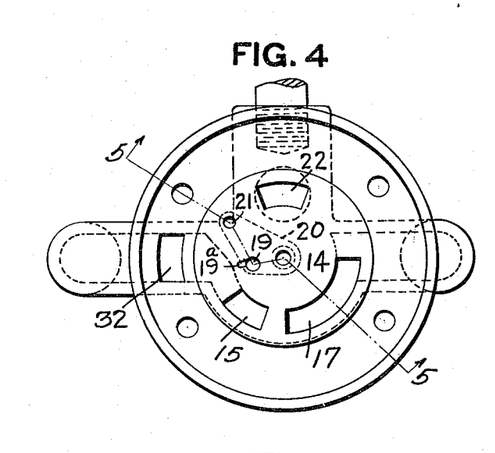
Fig. 4 is a plan view of the seat of said valve.
Figure 5:
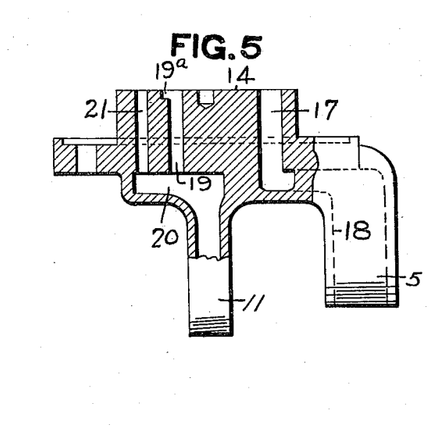
Fig. 5 is a vertical section on the line 5—5, Fig. 4.
Figure 6:
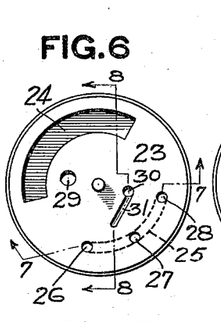
Fig. 6 is a bottom view of the disk of said valve.
Figure 7:
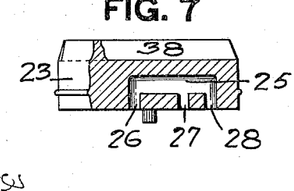
Figs. 7 and 8 are vertical sections through the valve disk on the lines 7—7 and 8—8 respectively, Fig. 6.
Figure 8:
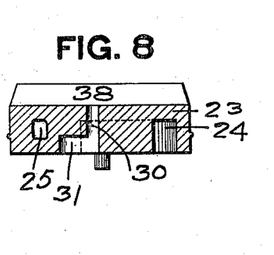

The engineer's brake valve 4 comprises a suitable casing comprising the lower portion 12 and the upper portion 13 suitably secured together. On the lower portion 12 is the valve seat 14, provided with a port 15 communicating with the passage 16 in an extension on the casing to which the main reservoir pipe 3 is connected; a port 17 communicating with a passage 18 in an extension of the casing to which the train pipe 5 is connected; a port 19 communicating with the passage 20 in an extension of the casing to which the brake cylinder pipe 11 is connected; a port 21 cored through the casting and also communicating with the passage 20; and an exhaust port 22 leading to the atmosphere.

Coöperating with the seat is the rotary disk valve 23 which is provided on its lower face with the arc shaped cavity 24 of considerable length and in its body with a cored arc shaped passage 25 also of considerable length and which communicates with the face of the disk by means of three ports, 26, 27 and 28. Extending entirely through the disk are two ports 29 and 30, the latter communicating at its lower end with a groove 31 cut in the lower face of the disk. The casing of the valve is provided with a port 32 leading from the main reservoir passage 16 to a chamber above the rotary disk valve. The disk valve is adapted to be rotated by means of a suitable handle 34, connected to the stem 35 of a rotary member 36 mounted in the casing and having a suitable connection with the disk, such as the key 37 fitting in a groove 38 in the disk. The handle is provided with the usual spring-pressed dog 39 coöperating with the notches in the quadrant 40, all as is usual in engineer's brake valves.

Figure 9:
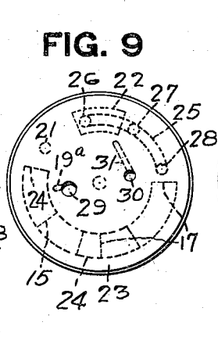
Figs. 9 to 15 are diagrammatic views representing the different positions of the valve.

The engineer's valve described has seven positions, as follows:

1. Straight air and holding position, shown in Fig. 9, in which the brake handle 34 is at the extreme left hand position with the dog 39 bearing against the shoulder 41 on quadrant 40. In this position the port 29, which extends through the valve, registers with the port 19 in the valve seat and allows main reservoir pressure to pass from the chamber above the rotary valve directly to the brake cylinder pipe 11 and thence into the engine and tender brake cylinders, applying the brakes on the engine and tender by direct air pressure. At the same time the cavity 24 in the lower face of the rotary disk bridges the ports 15 and 17 in the seat and this allows main reservoir pressure to pass into the train pipe so that the pressure in the train pipe is being increased. In this position of the valve, therefore, the engine brakes are being applied while the train brakes are being released, or if the train brakes had previously been released, then the valve supplies air to the train pipe in order to prevent the train brakes from applying.

Figures 10, 11, 12:
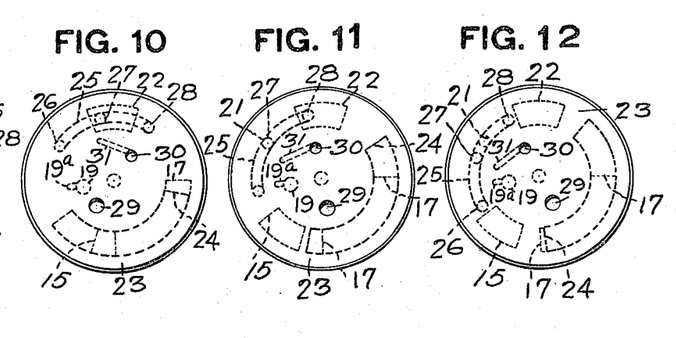

2. Running and full release position, shown in Fig. 10, in which the dog 39 of the brake valve handle is in contact with the shoulder 42 on the quadrant 40. In this position of the valve the port 21 in the valve seat which communicates with the passage 20 leading to the brake cylinder pipe 11 is in register with the port 26 in the rotary disk, which port communicates with the cored passage 25, while the port 27 of said cored passage registers with the exhaust port 22 in the valve seat, thereby exhausting the pressure from the engine and tender brake cylinders and releasing these brakes. At the same time the ports 15 and 17 in the valve seat are still bridged by the cavity 24 in the rotary disk so that main reservoir pressure passes into the train pipe to also release the train brakes.

3. Independent release position, shown in Fig. 11, in which the dog 39 of the brake valve handle is in contact with the shoulder 43 of the quadrant 40. In this position of the valve the port 21 in the valve seat registers with the port 27 of the cored passage 25 in the rotary disk while the port 28 of said cored passage registers with the exhaust port 22. Consequently the pressure from the engine and tender brake cylinders is exhausted to the atmosphere and these brakes released. In this position of the valve the rotary disk has moved around to such an extent that its cavity 24 no longer registers with the port 15 in the valve seat so that main reservoir pressure can no longer flow to the train pipe and the train brakes, if applied, are being held.

4. Lap position, shown in Fig. 12, in which the dog 39 of the brake valve handle bears against the shoulder 44 on the quadrant 40. In this position of the valve all ports of the valve seat are lapped or closed by the rotary disk.

Figure 13:
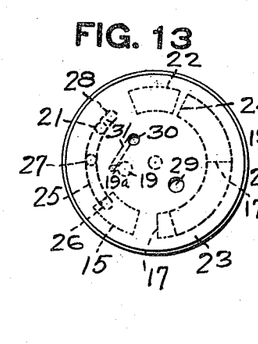

5. Maintenance lap position, shown in Fig. 13, in which position the dog 39 of the brake valve handle rests in the notch 45 in the quadrant 40. In this position all of the ports are lapped or closed except that the groove 31 communicating with the port 30 through the rotary disk, is in register with the groove 19ª formed in the valve seat and communicating with the port 19. Consequently, main reservoir pressure from on top of the rotary disk passes through these ports to the passage 20 and through the brake cylinder pipe 11 to the engine and tender brake cylinders. This position is for two purposes;—it not only supplies any leakage from the engine and tender brake cylinders without affecting the train brakes, since the train pipe port is not in communication with either the main reservoir port or the exhaust port, but it may also be used, when desired, to apply the engine and tender brakes before applying the train brakes, for the reason that after the valve has been left in this position for a little while to apply the engine and tender brakes it can then be moved to the sixth, or service position, which, while applying the engine and tender brakes, will also apply the train brakes.

Figure 14:
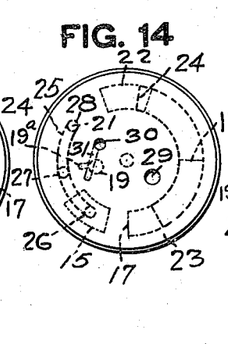

6. Service position, shown in Fig. 14, and in which the dog 39 of the brake valve handle is in contact with the shoulder 46 on the quadrant 40. In this position the cavity 24 in the rotary disk connects the train pipe port 17 with the exhaust port 22, lapping over the latter only a short distance, thereby permitting train pipe pressure to exhaust to the atmosphere through a restricted opening and setting the train brakes with the usual service application. At the same time the main reservoir port 15 in the valve seat is in register with the port 26 communicating with the cored passage 25 in the body of the rotary disk while the port 28 of said cored passage registers with the port 21 in the valve seat, which latter port communicates with the passage 20 leading to the engine and tender brake cylinder pipe. Consequently main reservoir pressure passes into the brake cylinder pipe 11 and applies the engine and tender brakes by a direct application of air. At the same time the grooves 19ª and 31 are in register, through which further air passes from the main reservoir to the engine and brake cylinders. Consequently, in this position of the valve the train brakes are automatically applied while the engine and tender brakes are applied with direct or straight air pressure.

Figure 15:
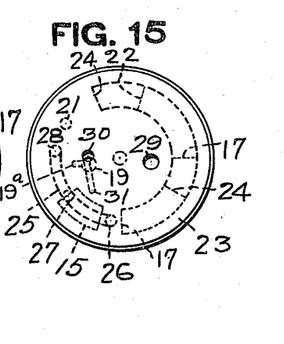

7. Emergency position, shown in Fig. 15, in which the dog 39 of the brake valve handle contacts with the shoulder 47 on the quadrant 40. In this position the rotary disk has moved around slightly farther to the right so that the cavity 24 laps entirely over the exhaust port 22, thereby connecting the train pipe port 17 to the atmosphere through an unrestricted opening and causing the train brakes to be set with the usual emergency application. At the same time the port 30 through the rotary disk registers with the port 19 in the seat, thereby allowing main reservoir pressure to pass directly from on top of the rotary valve through the passage 20 and pipe 11 to engine and tender brake cylinders. Consequently, in this position of the valve the train brakes are applied automatically with an emergency application and at the same time the engine and tender brakes are applied by a straight air or direct application, and since the valve is usually allowed to remain in this position while the application is being made and not moved back to lap, as soon as the required reduction of pressure in the train pipe has been secured, as in the case of a service application, the engine and tender brake cylinders are being continually applied with main reservoir pressure so as to maintain said brakes regardless of cylinder leakages.

From the foregoing it will be observed that by means of this brake valve the engine and train brakes can be simultaneously applied either for a service or emergency application by placing the brake valve in positions six and seven respectively, and can also be simultaneously released by placing the valve in the second or full release position. The first, third and fifth positions of the valve provide important additional functions by independent control of engine and train brakes as follows:

Should it be desired to apply the engine brakes without applying the train brakes, the valve is moved to either the first, or straight air and holding position, or to the fifth, or maintenance lap position. In either of these positions the engine and tender brake cylinders are supplied with pressure direct from the main reservoir, while in neither position is the train pipe connected to the exhaust port 22 so that the train brakes are not applied. In ordinary practice all straight air applications of the engine and tender brakes are intended to be made by placing the valve in the first or straight air position, since in this position the train pipe is being supplied with air from the main reservoir, thereby either releasing the train brakes in case they should be applied or preventing them from going on. Should it be desired to release the engine brakes and keep the train brakes applied, as, for instance, when the engine wheels are skidding or when the train is liable to bunch so hard on the engine as to cause it to buckle, it is merely necessary to place the valve in the third, or independent release position, in which position the train pipe port is out of communication with either the main reservoir port or exhaust port while the engine brake cylinder port 21 is in communication with the exhaust port 22, thereby permitting the engine and tender brakes to release.

Should it be desired to release the train brakes while holding the engine brakes as, for instance, when descending a long heavy grade and in order to permit the auxiliary reservoirs to be re-charged, it is merely necessary to place the valve in the first, or holding position, since in this position the pressure in engine and tender brake cylinders is maintained by the registering of the ports 19 and 29 while the main reservoir is connected through passage 24 with the train pipe, thereby re-charging said pipe and the auxiliary reservoirs, and at the same time releasing the train brakes. This position of the valve is also used in case the engine brakes are released while the train brakes are applied and it is desired to apply the engine brakes and release the train brakes, for in this position the brake cylinders on the engine and tender are receiving air at the same time that the train pipe is being charged up.

Should the packing leathers of the engine and tender brake cylinders leak, the danger of losing the engine braking power can be overcome after a service application has been made by simply placing the valve in the fifth, or maintenance lap position, in which the train pipe is lapped or blanked while main reservoir pressure is free to pass through a restricted opening formed by the registering of the grooves 19ᵃ and 31 and into the brake cylinders on engine and tender.

The railroads demand that the engineers test the brakes of all passenger trains while running. With ordinary automatic brake systems this test cannot be made with any degree of certainty, for the reason that the brakes on engine and train are applied and released simultaneously, so that should the engine brakes be effective and the train brakes defective this fact cannot be easily detected, since the engineer would believe that the slowing down of the train caused by the application was due to effective brakes on engine and train, whereas it might be due to the effective brakes on the engine alone. Consequently, he would be misled into thinking that he had a greater braking capacity than actually existed.

With my brake valve a positive running test can be made, for the reason that as soon as the engine and train brakes have been applied simultaneously, by going to the sixth, or service position, the engineer can immediately return the brake valve to the third, or independent release position, and release the engine and tender brakes while holding the train brakes applied, and if the speed of the train is not materially reduced he will known that his train brakes are defective, while if the speed is reduced he knows that his train brakes are in good working order.

By means of my valve the engine brakes can be graduated off after either a service or straight air application while the train brakes are applied. This is done by placing the valve in the third, or independent release position, long enough to allow the brake cylinder pressure to be partly reduced and then moving the valve to lap position and stop the further flow of air from the cylinders, and this can be repeated until the pressure in the engine and tender brake cylinders is reduced to any desired amount. This is a valuable feature when the engine brakes have been applied harder than the conditions require. To graduate off the straight air application the valve is moved from the first or holding position to the second or running position and then back to holding position and again back to running position as often as necessary to reduce the brake cylinder pressure to the required degree.

Figures 16, 18:
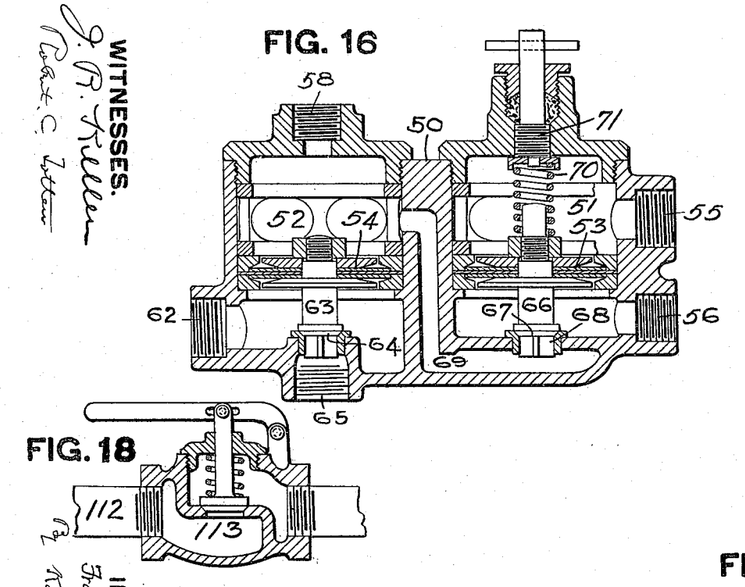
Fig. 16 is a vertical section through the duplex cylinder control valve.
Fig. 18 is a section through the governor control valve.
Figure 17:
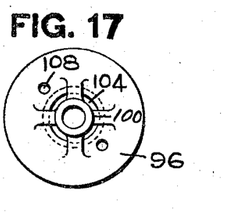
Fig. 17 is a plan view of the piston of the latter.

In the foregoing description the brake valve has been described as though the pressure from the engine and tender brake cylinders flowed through the valve to the atmosphere. While the effect is the same as though this occurred, this is not exactly the true condition for the reason that only a portion of the air from the brake pipe 11 is evacuated to the atmosphere through the engineer's brake valve, while the pressure from the brake cylinders themselves takes a more direct course to the atmosphere through a separate valve, shown at 50, and which I term a duplex control valve. This valve comprises a suitable casing having therein two chambers 51 and 52, both of which are divided by diaphragms 53 and 54 respectively. The chamber 51 above the diaphragm 53 is connected by a pipe 55 to the train pipe 5, while said chamber below the diaphragm is connected by a pipe 56 to the main reservoir pipe 3 above the pressure reducing valve 57. The chamber 52 above the diaphragm 54 is connected by a pipe 58 to the brake cylinder pipe 11 and between this point of connection and the brake cylinders themselves is placed a check valve 59 arranged to seat toward the engineer's brake valve so as to permit pressure to flow from the engineer's brake valve past said check valve into the brake cylinders but not to flow in the reverse direction. Between this check valve and the brake cylinders is placed a suitable reducing valve 60, and in the pipe leading to the tender brake is also preferably placed a safety valve 61. The chamber 52 below the diaphragm 54 is connected by pipe 62 to the brake cylinders. The diaphragm 54 has connected thereto a stem 63 carrying a valve 64 coöperating with a suitable seat placed in the exhaust port 65. Similarly the diaphragm 53 carries a stem 66 provided with a valve 67 coöperating with a suitable seat in a port 68 furnishing communication between the lower portion of the chamber 51 and a passage 69 leading through the casting to the chamber 52 above the diaphragm 54. The diaphragm 53 is normally held downwardly so as to hold the valve 67 against its seat by means of a compression spring 70 which is adjusted by a threaded stem 71 extending out through the top of the casing. The functions of this duplex control valve are to control the exhaust from the engine and tender brake cylinders and to cause the brakes on engine and tender to be applied automatically when a hose bursts or when the engine is used in double-heading. These functions are accomplished as follows: The diaphragm 53 is subjected on its upper surface to train pipe pressure coming through pipe 55 and on its lower surface to an exactly similar pressure derived through pipe 56 from the main reservoir pipe 3 above the pressure reducing valve 57. Consequently, the port 68 is normally closed. The spring 70 will be set so as to exceed slightly the number of pounds to which the train pipe pressure is reduced in making service application of the brakes say twenty pounds. When, therefore, the engineer's brake valve is placed either in the first or straight air position or in the sixth or service position, the diaphragm 53 is not affected, since in service application the change of pressure on the upper face of said diaphragm is not sufficient to overcome the tension of the spring 70. In both cases the main reservoir pressure flows through the pipe 11 past check valve 59 and into the engine and tender brake cylinders, said pressure passing down through pipe 58 into chamber 52 on top of the diaphragm 54, thus holding the valve 64 to its seat and closing the exhaust from these cylinders. When it is desired to release the engine brakes, the brake valve is placed either in the second, or running position, or the third, or independent release position. In both cases the brake cylinder pipe 11 is connected with the exhaust 22 in the brake valve. This causes the check valve 59 to seat, preventing back flow of air from the brake cylinders and causing the brake pipe 11 to be quickly evacuated, thus relieving the pressure on top of the diaphragm 54 and permitting the brake cylinder pressure below said diaphragm to lift the same and un-seat the valve 64, thereby permitting the brake cylinder pressure to escape to the atmosphere through exhaust port 65. By means of this valve, therefore, the exhaust from the engine and tender brakes is controlled and a quick release obtained due to the fact that only a small amount of air need escape through the engineer's brake valve.

Should a hose burst so as to apply the train brakes with a severe or emergency application, this exhaust control valve serves to automatically apply the engine and tender brakes and thus prevent the engine from pulling away from the train. This is accomplished as follows: When a hose breaks train pipe pressure immediately escapes, thereby quickly relieving the diaphragm 53 from all pressure on its upper surface. Consequently, the main reservoir pressure acting on the under-surface of said diaphragm lifts the same against the tension of the spring 70, raises the valve 67 and permits main reservoir pressure to pass through port 68, passage 69, into chamber 52 and thence through pipe 58 and past the check valve 59 to the brake cylinder. This will occur either when the engine is single heading or double heading. In the brake pipe 11 between the pipe 58 and the engineer's brake valve 4 is a partial check valve 72, i. e. a check valve seating toward the engineer's valve but constructed to only partly close the pipe when seated. The purpose of this is to prevent the air rushing to the atmosphere through the engineer's valve and prevent failure of application of the brakes when a hose bursts and the engineer's valve is in either running or release positions.

When the engine is to be used for double heading and is used as the second engine in the double head, the spring 70 is adjusted so as to practically take all pressure off the diaphragm 53. Consequently, said diaphragm is subjected to uniform pressures on top and bottom so that when the train pipe pressure is reduced in making an ordinary service application the diphragm will lift, thereby opening the port 68 and permitting main reservoir pressure to pass up to the chamber 52, driving the valve 64 to its seat and closing the exhaust from the brake cylinders and also passing through pipe 58 into said brake cylinders. When the brakes are to be released train pipe pressure is restored to the top of the diaphragm in chamber 51 and this, together with a slight tension of the spring 70, causes the valve 67 to seat, shutting off communication from the main reservoir to the brake cylinders. A small vent is provided from the brake cylinder pipe 11, being formed by placing the engineer's brake valve between the third and fourth positions, i. e. between independent release and lap positions. In this position the ports 27 and 28 of the cored passage 25 will slightly lap the brake pipe port 21 and the exhaust port 22, thus forming a slight vent. The pressure in the brake cylinder pipe 11 leaks through this vent until the pressure in the chamber 52 is sufficiently reduced to cause the diaphragm 54 to lift and open the valve 64 to exhaust the brake cylinders to the atmosphere in the usual way.

Figure 19:
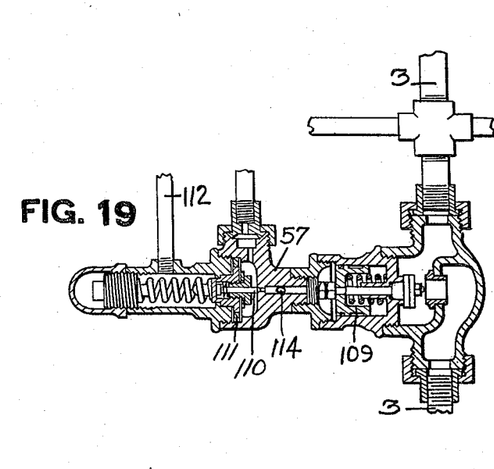
Fig. 19 is a sectional view of the governor or pressure reducing valve.

The pressure reducing valve 57 may be of the usual type, having piston 109 for closing the same when the desired pressure in train pipe is reached, said train pipe pressure on the piston being controlled by the pin valve 110 secured to the diaphragm 111. I provide means whereby the valve 57 may be opened in order to permit full reservoir pressure to pass through the engineer's valve. This is done by admitting to the diaphragm 111 pressure through a pipe 112 from the main reservoir passage 16 in the brake valve. A valve 113 of any suitable type controls the pipe 111. Normally this valve is kept closed, thereby permitting the pressure reducing valve to partly throttle the main reservoir pipe 3 and reduce its pressure in the usual way. By opening the valve 113, however, the pin valve 110 is closed, allowing the pressure on the piston 109 to escape through the leak port 114 so that the pressure reducing valve is released and full main reservoir pressure passes up into the engineer's brake valve. I also provide in the system numerous cocks, such as a cut-out cock 115 in the pipe 56 leading to the lower portion of the chamber 51 in the duplex control valve and a three-way cut-out cock 116 at the point of connection of the train pipe 5 with the pipe 55 leading to the upper portion of the chamber 51 in the duplex control valve. This last named valve is to be closed after the application of the brakes due to a burst hose in order to permit the engine brakes to be released, the closing of said valve placing the pipe 55 in communication with the train pipe passage 18 of the engineer's brake valve and allowing the pressure to accumulate in the chamber 51 above the diaphragm 53. It is also used to cut off the engineer's valve when double heading.

The operation of the entire system will be understood from the foregoing description. By this system I not only effect all the operations of the usual automatic systems but also secure independent control over engine and train brakes in the manner heretofore fully described.

What I claim is:

1. In an air brake system, the combination of a main reservoir, a train pipe, automatic brake mechanism connected to said train pipe, an engineer's valve connecting the main reservoir and train pipe, a brake cylinder, a connection from the same to the main reservoir, a valve controlling said connection, a movable member for actuating said valve subjected on one side to train pipe pressure and on the opposite side to main reservoir pressure, and a brake cylinder exhaust valve controlled from said first named valve.

2. In an air brake system, the combination of a main reservoir, straight air brake mechanism on an engine, a train pipe, a connection from the main reservoir to the straight air brake mechanism on the engine, said connection being independent of the train pipe, automatic brake mechanism on a car connected to said train pipe, an engineer's valve arranged to connect the main reservoir to the train pipe and to the brake mechanism on the engine and to operate both said automatic and straight air brake mechanisms, a valve in the connections to the straight air brake mechanism and comprising a movable abutment controlling an exhaust valve for the brake mechanism, and a second movable abutment subject on one side to main reservoir pressure and on the other side to train pipe pressure and actuated by variations in train pipe pressure for admitting pressure to the first named movable abutment to close said exhaust valve.

3. An air brake valve having two chambers with movable members in each chamber, a train pipe connection to one side of the movable member in the first chamber, a reservoir connection to the opposite side of said movable member, a valve connected to said movable member and controlling a passage from the reservoir to one side of the movable member in the second chamber, a brake cylinder connection to said second chamber, and a valve connected to said second movable member and controlling an exhaust from the brake cylinder.

4. In an air brake system, the combination of a main reservoir, a brake cylinder, an engineer's brake valve, valve mechanism in a connection around the engineer's brake valve and arranged upon service reduction in train pipe pressure to control communication between the main reservoir and brake cylinder around the engineer's brake valve, and a cut-out cock and pressure controlling valve in said connection.

5. In an air brake system, the combination of a main reservoir, a brake cylinder, an engineer's brake valve, and valve mechanism communicating with the brake cylinder pipe, main reservoir, and train pipe, and arranged upon service reduction in train pipe pressure to open communication between the main reservoir and brake cylinder, and upon increase in train pipe pressure over main reservoir pressure to close said communication and open a brake cylinder exhaust between the brake cylinder and the engineer's brake valve.

6. In an air brake system, the combination of a main reservoir, a brake cylinder, an engineer's brake valve, and valve mechanism communicating with the brake cylinder pipe, main reservoir, and train pipe, and arranged upon service reduction in train pipe pressure to open communication between the main reservoir and brake cylinder, and upon increase in train pipe pressure to close said communication and permit exhaust from the brake cylinder pipe by way of the engineer's brake valve, and valve mechanism operated by main reservoir and brake pipe pressure for controlling the exhaust from the brake cylinder.

7. In an air brake system, the combination of a main reservoir, a brake cylinder, an engineer's brake valve, and valve mechanism in a connection around the engineer's brake valve and including a valve controlling communication between the main reservoir and brake cylinder around the engineer's brake valve, a piston subject on one side to main reservoir pressure and operated by variation in train pipe pressure for operating said valve, a valve for controlling the exhaust from the brake cylinder, and a movable abutment subject to main reservoir pressure and operated by brake cylinder pressure for operating said exhaust valve.

8. In an air brake system, the combination of a main reservoir, a brake cylinder, an engineer's brake valve, and valve mechanism comprising a casing having a chamber communicating with the main reservoir and brake pipe, a valve in said chamber subject to variations in train pipe pressure for controlling communication between the main reservoir and brake cylinder, and a brake cylinder exhaust valve operated by brake cylinder and reduced main reservoir pressures and adapted to open an exhaust from the brake cylinder on reduction in the reduced main reservoir pressure.

9. In an air brake system, the combination of a main reservoir, a brake cylinder, an engineer's brake valve, and valve mechanism comprising a casing having a chamber communicating with the main reservoir and brake pipe, a valve in said chamber for controlling communication between the main reservoir brake cylinder, a piston in said chamber subject to variations in train pipe pressure for operating said valve, a valve controlled by the engineer's brake valve for opening communication from the brake cylinder to exhaust, and a by-pass around said exhaust valve for charging the brake cylinder.

In testimony whereof, I the said FRANK H. DUKESMITH have hereunto set my hand.

FRANK H. DUKESMITH.

Witnesses:
F. W. WINTER,
ROBERT C. TOTTEN.

Copies of this patent may be obtained for five cents each, by addressing the "Commissioner of Patents, Washington, D. C."